United States Patent [19]

Suzuki et al.

[11] Patent Number: 5,283,800
[45] Date of Patent: Feb. 1, 1994

[54] METAL VAPOR LASER APPARATUS AND METHOD

[75] Inventors: Setsuo Suzuki; Yasushi Iseki; Ikuo Watanabe; Kazuo Hayashi; Etsuo Noda; Tomoko Ogawa; Hironobu Kimura; Nobutada Aoki, all of Tokyo, Japan

[73] Assignee: Kabushiki KaishaToshiba, Kanagawa, Japan

[21] Appl. No.: 858,375

[22] Filed: Mar. 26, 1992

[30] Foreign Application Priority Data

Mar. 27, 1991 [JP] Japan ................................. 3-063502
Mar. 27, 1991 [JP] Japan ................................. 3-063520

[51] Int. Cl.$^5$ ................................................ H01S 3/22
[52] U.S. Cl. ........................................ 372/60; 372/59; 372/56
[58] Field of Search ........................... 372/55–57, 372/58, 59, 60

[56] References Cited

U.S. PATENT DOCUMENTS

| | | | |
|---|---|---|---|
| 3,654,567 | 4/1972 | Hodgson . | |
| 4,224,579 | 9/1980 | Marlett et al. | 372/59 |
| 4,232,274 | 11/1980 | Tokudome et al. | 372/59 |
| 4,701,925 | 10/1987 | Fuke et al. . | |
| 4,866,725 | 9/1989 | Deki et al. | 372/56 |
| 4,876,690 | 10/1989 | Nishida et al. | 372/56 |
| 4,955,033 | 9/1990 | Maitland et al. | 372/56 |
| 4,991,180 | 2/1991 | Yamaguchi et al. | 372/56 |
| 5,023,883 | 6/1991 | Jacobs et al. | 372/56 |

OTHER PUBLICATIONS

Zhen-Guo Huang, et al., "Influence of molecular Gases on the Output characteristics of a Copper Vapor Laser", Japanese Journal of Applied Physics, vol. 25, No. 11, Nov. 1986, pp. 1677–1679.
Influence of Molecular Gases on The Output Characteristics of a Copper Vapor Laser Japanese Application, Zhen-Guo Huang et al vol. 25, No. 11 pp. 1677–1679, Nov. 1986.
A Gold-Vapor Laser Using Ne-H$_2$ as Buffer as Gass Appl Phys. B 44, 57–59, 1987, Z. G. Huang et al.
High Power and High Efficiency Copper Bromide Lasers, N. V. Sabotinov (1989) et al., SPIE vol. 1041 Metal Vapor, Deep Blue and Ultraviolet Lasers.

Primary Examiner—Scott, Jr. Léon
Attorney, Agent, or Firm—Finnegan, Henderson, Farabow, Garrett & Dunner

[57] ABSTRACT

A metal vapor laser apparatus has a gas supply device. The device supplies at least two kinds of gases to a container of the laser apparatus controlled individually. One of the gases is selected from the group of the molecular gas such as hydrogen gas, the other is selected from the group of rare gas such as neon gas. By adjusting the mixture ratio of these gases, the laser beam output is obtained efficiently. The molecular gas should be supplied when a metal lump, such as copper, arranged in the container is melting.

38 Claims, 18 Drawing Sheets

METAL VAPOR LASER APPARATUS AND METHOD

BACKGROUND OF THE INVENTION

1. Field of the Invention

The present invention relates to a laser method and apparatus, and, more particularly, to such a method and apparatus in which a metal vapor, heated by electric discharge, is used to radiate a laser beam by exciting the metal vapor.

2. Description of the Related Art

A structure of a conventional metal vapor laser apparatus 101 is shown in FIG. 1. As shown, this type of metal vapor laser apparatus 101 includes a cylindrical vacuum container 102 having a heat insulating material 103 and a plasma tube 104. A pair of discharge electrodes 105 and 106 are set at each end of the plasma tube 104. A discharge chamber 107, containing a buffer gas fill, is surrounded by the plasma tube 104 and the discharge electrodes 105 and 106.

The discharge electrodes 105 and 106 are connected to a power supply 108. Further, the vacuum container 102 is sealed hermetically by windows 109 and 110 closing both ends of the vacuum container 102. Further, a resonator, comprised of an output mirror 111 and a total reflective mirror 112, is provided outside of the windows 109 and 110. In addition, lumps 113 of a laser medium metal are provided within the plasma tube 104.

As used herein and in the appended claims, the term "lump" means a piece of metal having an indeterminate size and shape. Generally, the size of a lump used in the metal laser art approximates one cubic centimeter but precision in this respect is not necessary. Also, it is common practice to use about 3-5 such lumps in the tube 104, but the number may vary depending on the size of the tube.

Each end of the vacuum container 102 is connected with a buffer gas supply device 114 and a vacuum pump 115, respectively. Buffer gas (rare gas such as neon, helium, etc.) is supplied into the vacuum container 102 by the buffer gas supply device 114 and the buffer gas in the vacuum container 102 is exhausted by the vacuum pump 115.

When a laser beam is generated by the metal vapor laser apparatus 101 described above, a buffer gas is supplied into the vacuum container 102 by the buffer gas supply device 114 and then exhausted from the vacuum container 102 by the vacuum pump 115 in a manner to maintain the chamber 107 under low pressure. Voltage is applied between the discharge electrodes 105 and 106 from the power supply 108, and a pulsed discharge occurs in the discharge chamber 107. The plasma tube is heated and the metal lumps 113 in the tube, for example, gold or copper lumps, are also heated to within the range of 1500° C.-1700° C. and converted to a metal vapor. The metal atoms in the vapor state are excited by the glow discharge in the plasma tube 104, and the laser beam is developed at the mirrors 111, 112 of the resonator.

To increase the laser beam output of such conventional apparatus, it has been the practice to increase the diameter of the bore of the discharge chamber 107 in recent years. However, if the diameter size of the bore of the discharge chamber 107 (hereinafter referred to simply as "bore") becomes about 60 mm or more, (i.e., the cross sectional area is 25 cm² or more), intensity near the center of the laser beam decreases. If the bore becomes about 80 mm, this phenomenon becomes more and more conspicuous. This phenomenon is generally referred to as a "annular beam" and occurs because, in a metal vapor laser device with the discharge chamber 107 having a large bore, the temperature of gas around the center of the discharge chamber 107 is generally higher than that of the nearby wall of the plasma tube 104 by more than 1000° C. As a result, the density of the lower level atoms in the center is increased relative to that of the nearby wall and the gain in the center part is reduced to produce the annular beam.

As the bore of the discharge chamber 107 is increased, the ratio of laser beam output to input electrical power, i.e., energy efficiency, tends to decrease. Generally, the laser beam output is increased with discharge power. When the electrical discharge power is especially high, or the bore of the plasma tube is very large, or cycle frequency is high, the decrease in laser beam output efficiency is remarkable.

With respect to the bore, the annular beam phenomenon begins to occur when the bore size is about 60 mm and increases remarkably when the bore size is about 80 mm. The cause of the phenomenon is that, when the temperature at the center of the discharge chamber 107 is high, the metal atomic density at lower oscillation levels becomes higher at the center of the chamber 107 and lowers the intensity of the laser beam in that region.

The annular beam phenomenon is represented in FIG. 2 by a curve resulting from a plotting of laser output power against time of laser operation. As shown, after (H) hours of laser operation, a peak power (P) of the laser beam is developed. However, thereafter the power is gradually reduced to a constant power (L) which is significantly lower than peak power (P).

A report of a study that was tried to prevent the annular beam phenomenon and increase the output by deexciting the lower level metal atoms by mixing molecular gas such as hydrogen, etc. in buffer gas to have molecular gas collide with the lower level metal atoms in the small bore laser device (the direct diameter 32 mm) is found in an article by Zhen-Guao Huang et al.; Japanese Journal of Applied Physics Vol. 25, No. 11, 1986 pp. 1677-1679. According to this study, an annular beam in the green spectrum and generated in a small bore was improved and an increase of laser output power was observed at a mixing ratio below 1.8% of hydrogen gas to neon gas, as the buffer gas.

However, in the article reporting the above study, nothing was described about improving the ratio of a green beam line and a yellow beam line (G/Y ratio) to evaluate the annular beam phenomenon. When the G/Y ratio is large (i.e. the green beam lines are greater in number than the yellow beam lines), the annular beam increases at a lower rate, but when the G/Y ratio is small (i.e. the green beam lines are less in number than the yellow beam lines), the annular beam increases at a high rate of increase and the intensity of the oscillated laser beam at the center axis decreases. The relation between G/Y ratio and the annular beam phenomenon is found in the reported study. The value of G/Y ratio, however, is used as a measurement for the annular beam phenomenon. There is no description about improving the G/Y ratio to reduce the annular beam.

Further, in the above study, the laser output efficiency per applied power is as low as about 0.5% and is not an efficiency at the practical level (about 1 to 1.5%).

Laser output power and laser efficiency depend on the temperature of the metal lumps used as the laser medium because the metal vapor density is determined by the temperature of the metal lumps. Therefore, the temperature of the metal lumps must be controlled to maintain the metal lumps at the optimum temperature to supply the metal vapor in an optimum amount. Only in this way can the laser beam be obtained efficiently at higher laser output power. To control the temperature to the optimum value, a material for the thermal insulator, or the thickness of that thermal insulator must be established for the point of the heat transfer rate and the input energy to the plasma in order to optimize the temperature of the plasma tube.

SUMMARY OF THE INVENTION

Accordingly, it is an object of the present invention is to provide a high output and high efficiency metal vapor laser apparatus.

In accordance with the present invention, there is provided a metal vapor laser apparatus comprising a vacuum container to be filled with a buffer gas and a pair of electrodes in the vacuum container. A discharge power supply to apply voltage between the electrodes and a metal lumps to be vaporized by discharge arranged between the electrodes. Moreover, it comprises a gas supplying means for supplying at least one other gas, which is supplied in the container when the metal lumps melt.

BRIEF DESCRIPTION OF THE DRAWINGS

The aforementioned and other objects and advantages of this invention will become more apparent and more readily appreciated from the following detailed description of the presently preferred exemplary embodiments of the invention taken in conjunction with the accompanying drawings wherein:

FIG. 20 is a graph showing the relation between the surface temperature of metal lump surface and the mixtures ratio of the buffer gas;

DESCRIPTION OF THE PREFERRED EMBODIMENTS

Embodiment 1

Figure 1:
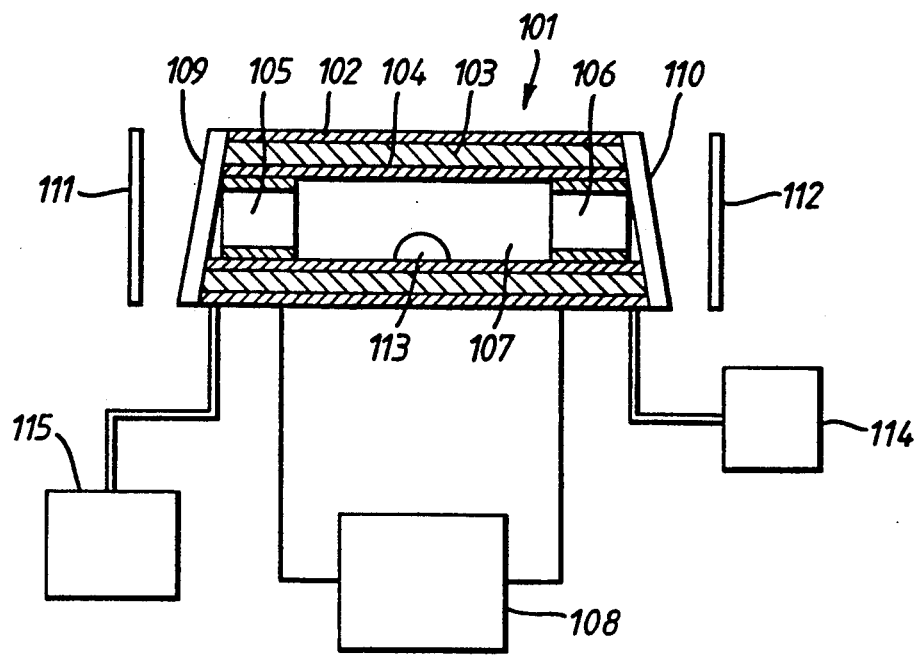
FIG. 1 is a schematic sectional view of a conventional metal vapor laser apparatus.
Figure 2:
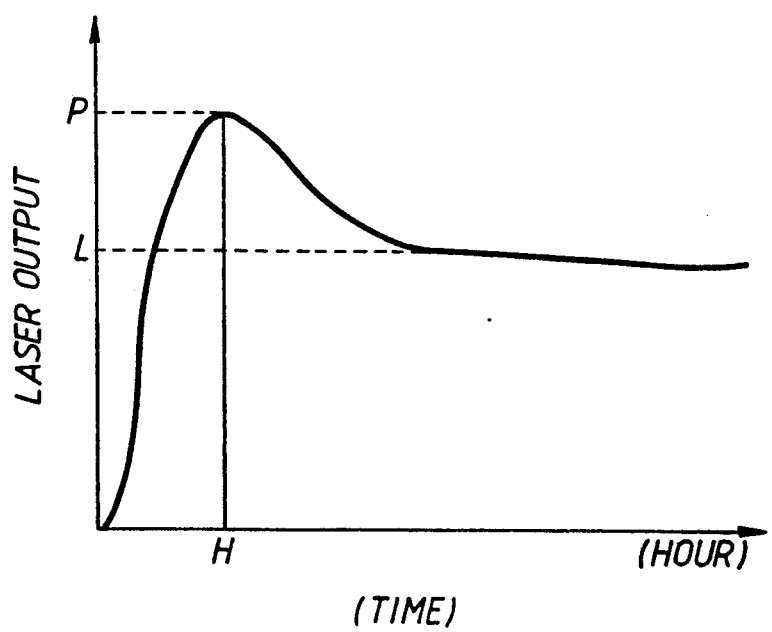
FIG. 2 is a graph showing the characteristics of the output power of a conventional metal laser apparatus.
Figure 3:
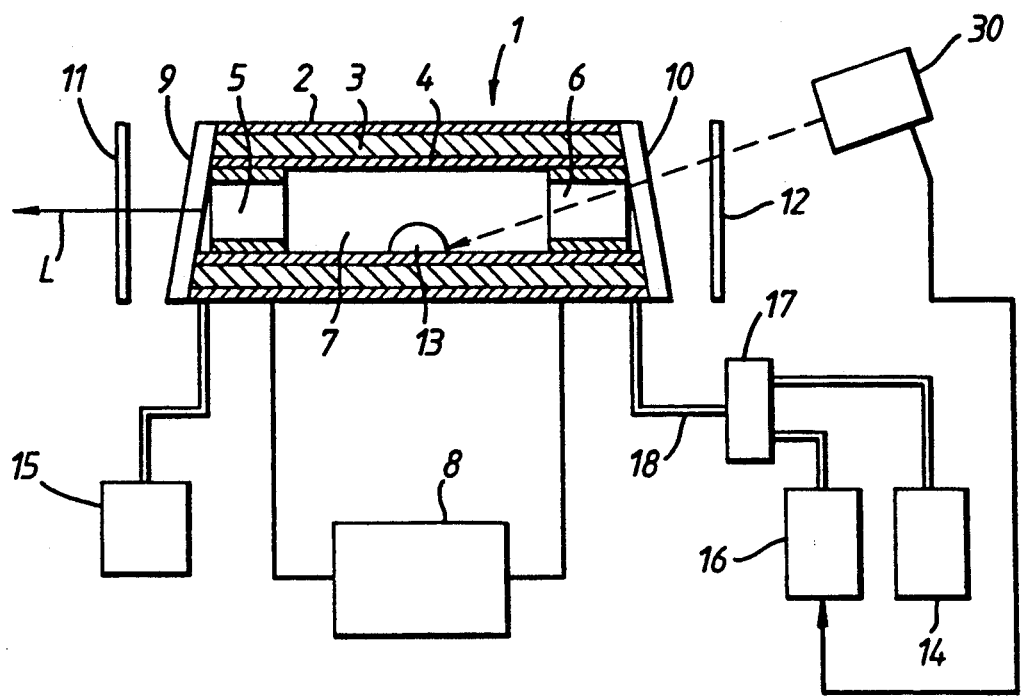
FIG. 3 is a schematic sectional view of a metallic vapor laser apparatus of the first embodiment according to the present invention.

A metal vapor laser apparatus 1, according to the present invention, is shown in FIG. 3 to include a buffer gas filled, cylindrical vacuum container 2 having a heat insulating material 3 and a plasma tube 4. A pair of discharge electrodes 5 and 6 are set at each end of the plasma tube 4. A discharge chamber 7 is surrounded by the plasma tube 4 and the discharge electrodes 5 and 6. In this embodiment, the diameter of the discharge chamber 7, i.e., the inner diameter of the plasma tube 4, is 80 mm (the cross-sectional area of the tube is about 50 mm$^2$.)

The discharge electrodes 5 and 6 are connected to a power supply 8. The inside of the vacuum container 2 is sealed hermetically by windows 9 and 10 closing both ends of the vacuum container. A resonator, comprised of an output mirror 11 and a total reflective mirror 12, is provided outside of the windows 9 and 10. In addition, laser medium metal lumps 13 are provided in the plasma tube 4. In this embodiment, copper is used as the metal lumps.

The surface temperature of the metal lumps is measured by a thermal detector 30 comprising a radiation thermometer. A measurement signal from the detector 30 is input to a molecular gas supply device 16 described in more detail below.

The vacuum container 2 is connected to a buffer gas supply device 14 and an exhaust device 15. In this embodiment, neon gas, one of the rare gases, is used as the buffer gas, and hydrogen gas is used as a molecular gas. The buffer gas supply device 14 and a molecular gas supply device 16 are connected with a, gas mix device 17 and joined to the vacuum container 2 through a pass tube 18.

The buffer gas and the molecular gas are exhausted from the container 2 by the exhaust device 15 at a rate greater than the rate of flow from the respective supply devices 14 and 16. Thus, both of these gases are caused to flow in the container 2 under low pressure. The exhaust device 15 includes a rotary pump, etc.

When operation of the apparatus 1 is initiated to generate a laser beam, the vacuum container 2 is evacuated and, initially, only one kind of buffer gas is supplied into the container 2 by the buffer gas supply device 14. High voltage is applied between the discharge electrode 5 and 6 from the power supply 8 and a pulsed discharge begins to occur in the discharge chamber 7. The plasma tube 4 is heated and metal lumps 13 in the tube 4 are also heated and converted to a metal vapor by the discharge. The metal atoms in the vapor state are excited by the discharge and laser oscillation is obtained. A laser beam L is radiated through the output mirror 11.

In this embodiment, the surface temperature of the metal lumps can be detected by the temperature detecting device 30 at any time. When the detecting device 30 detects the melting point of the metal lumps (in this case using copper lumps), a control signal is sent to the molecular gas supply device 16. By this control, the molecular gas is mixed with the buffer gas from the supply device 14 by control of the molecular gas supply device 16 and the mixed gas is supplied to the vacuum container 2 through the pass tube 18.

In the case of mixing the molecular gas with the buffer gas after melting the metal lumps, i.e., the temperature of the metal vapor is up to a certain value or more, the results of changing the ratio of the molecular gas to the buffer gas is explained in more detail below.

Figure 4:
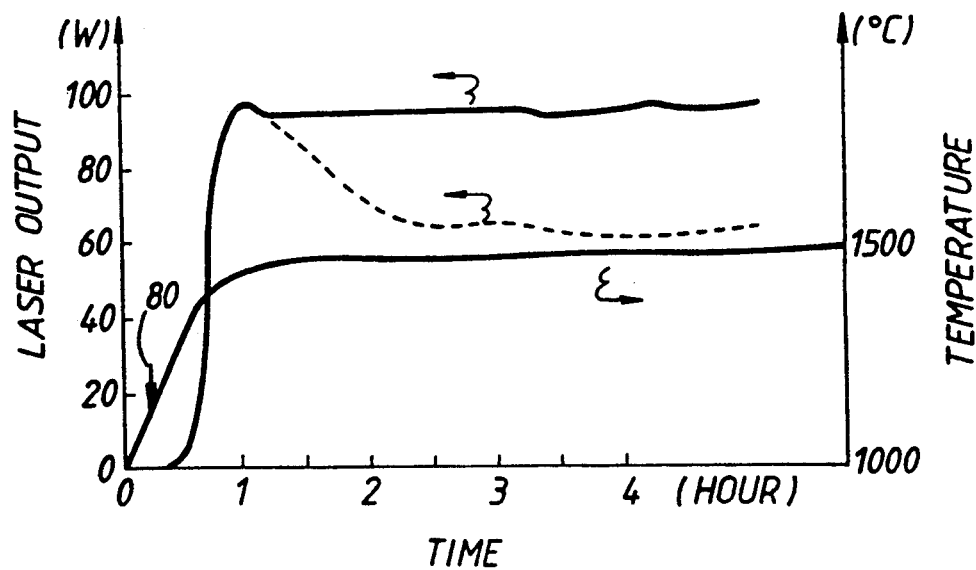
FIG. 4 and FIG. 12 are graphs showing the characteristics of laser output power.

In FIG. 4, the changes of the surface temperature of the metal lumps and laser output are shown. When the surface temperature reaches about 1210° C., i.e., the vapor pressure of copper metal is over about $10^{-2}\%$ when the buffer gas pressure 25 Torr, the mixing of hydrogen gas with the buffer gas is started (indicated by the arrow 80).

Figure 5:
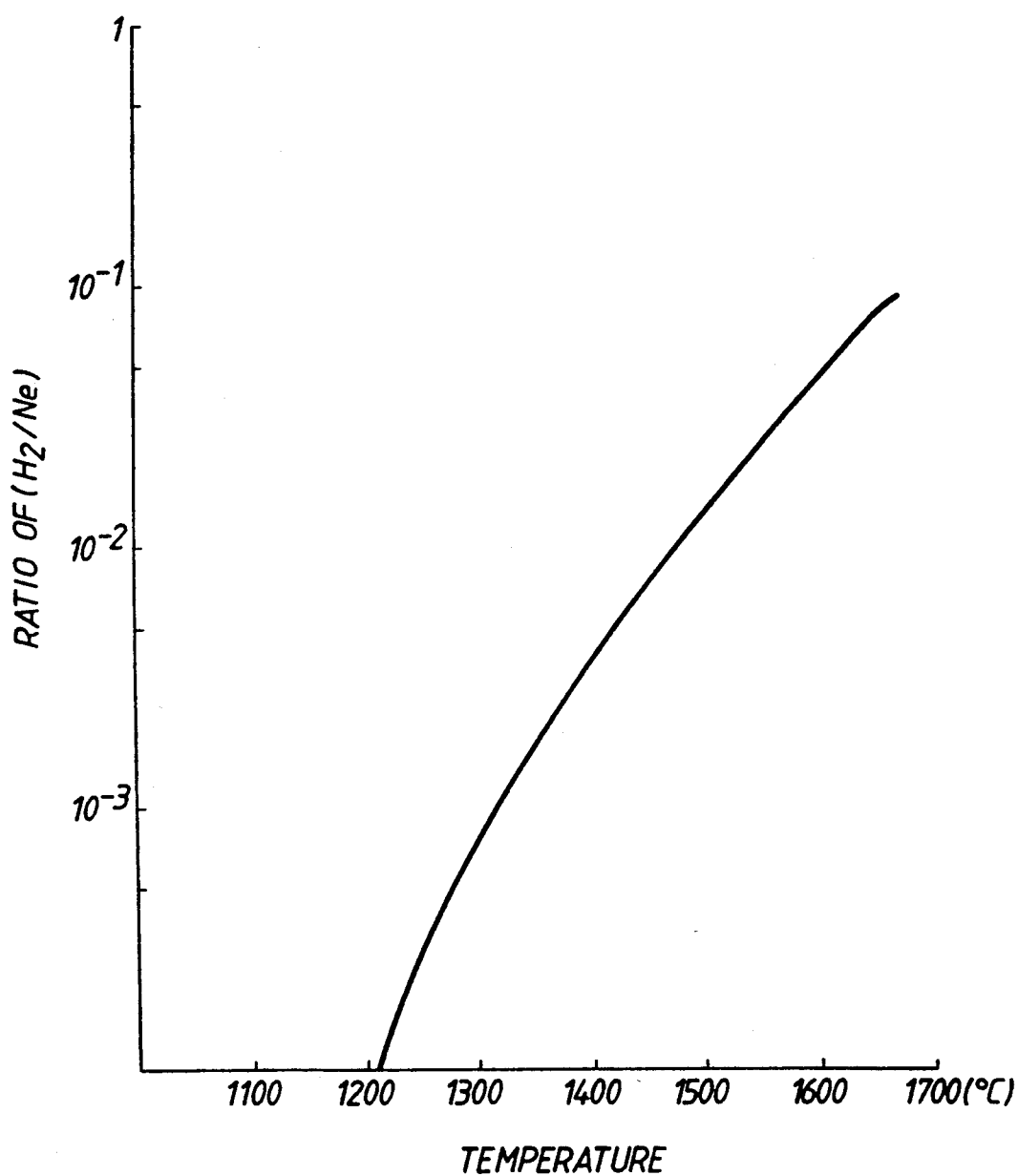
FIG. 5 is a graph showing the relation between the temperature of metal particle surface and the mixture ratio of the buffer gas.

After about 1 hour from the start of the operation, the ratio of the molecular gas to the buffer gas becomes a reasonable value to get the peak output. In this case, by the adding of hydrogen gas, reduction of the laser output is prevented (shown by a continuous line). The case of not adding a molecular gas is shown by a dotted line. There is a relationship of the metal vapor pressure, the buffer gas pressure and the surface temperature of the metal lumps. For instance, when the neon gas is used as the buffer gas (the pressure of the gas is 25 Torr), the relation between the ratio of the molecular gas to the buffer gas and the surface temperature is as shown in FIG. 5.

Figure 6:
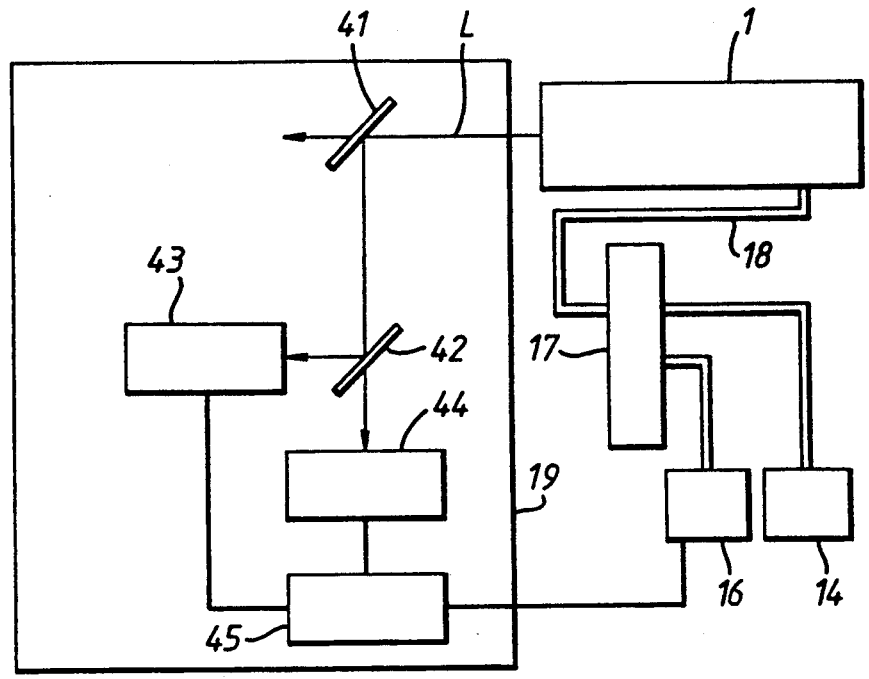
FIG. 6 is a schematic view of an apparatus to detect G/Y ratio.

In the described embodiment, the ratio of G to Y (G/Y) is detected and confirmed to measure the degrees of annular beam by the device shown in FIG. 6.

As shown in FIG. 6, a measuring device 19 to obtain the green and yellow beam lines includes a mirror 41 to reflect part of laser beam L to the mirror 42. The mirror 42, in turn, separates wavelengths 510.0 nm and 578.3 nm from the laser beam wavelengths reflected by the mirror 41. Optical detectors 43 and 44 detect the green and yellow beams separated by the mirror 42, and the control unit 45 calculates G/Y ratio from these green and yellow beams. Further, the signal from the control unit 45 is transmitted to the molecular gas supply device 16. And the gas mix device 17 controls a mixture ratio of hydrogen gas. Also, the molecular gas is automatically supplied to the buffer gas.

Figure 7:
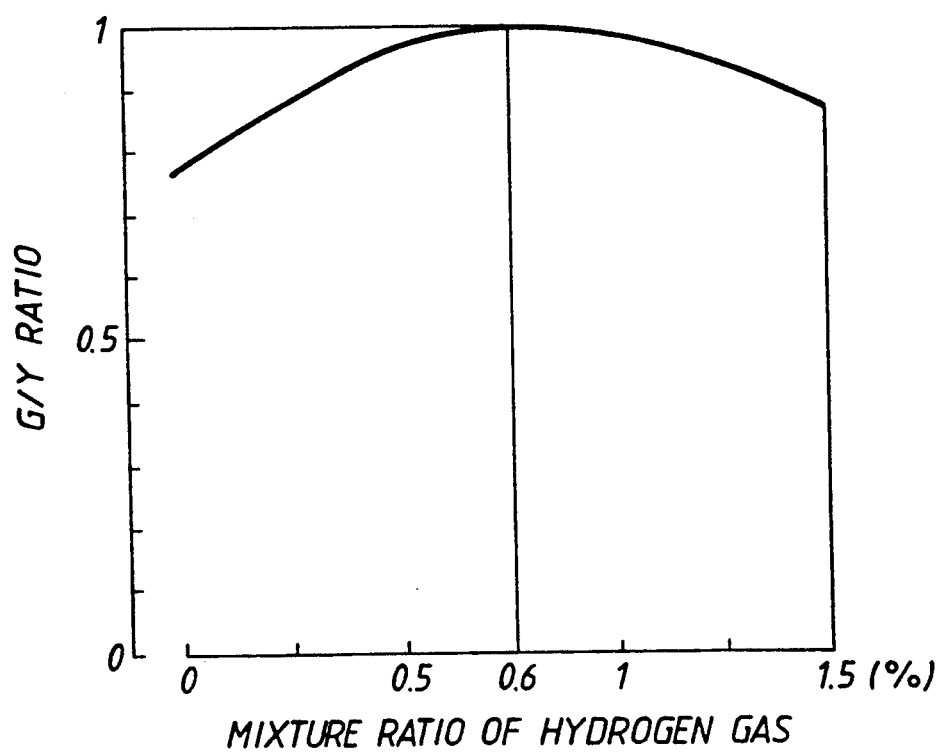
FIG. 7 is a graph showing the relation between G/Y ratio and additive amount of hydrogen gas.

FIG. 7 shows the relationship of the ratio of the green beam line (G) to the yellow beam line (Y) (G/Y) and the mixture ratio of hydrogen gas to be supplied in proportion to the size of the annular beam phenomenon.

As is seen from FIG. 7, the G/Y ratio with hydrogen gas can be larger than the G/Y ratio without hydrogen gas. In this embodiment, when the mixing ratio of hydrogen gas is 0.6%, the G/Y ratio reaches a peak.

Figure 8A:
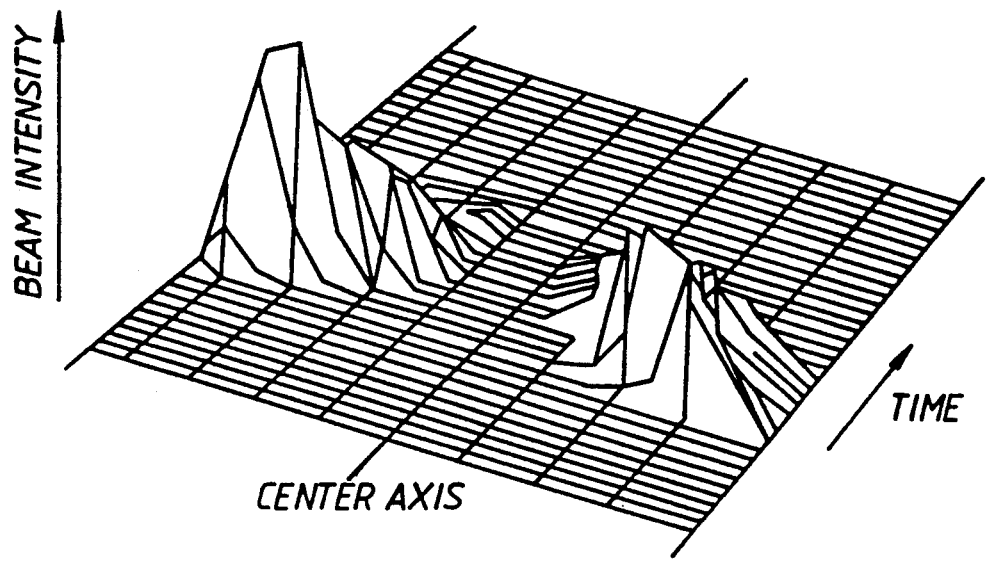
FIGS. 8 (a) and (b) are graphs showing the intensity distribution of the radiated laser beam intensity in the radial direction of the discharge area.
Figure 8B:
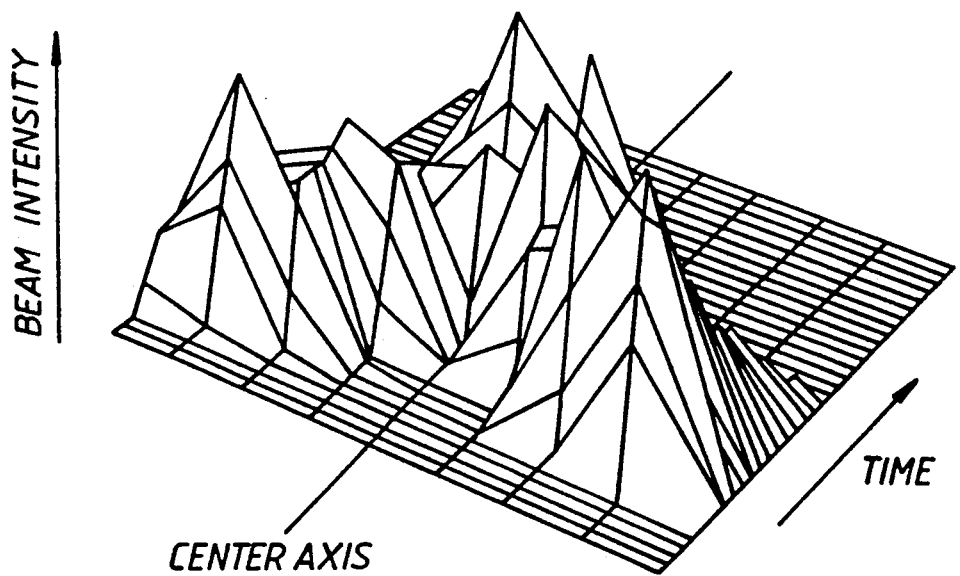

FIGS. 8(a) and (b) show the time-resolved radial distribution of laser beam intensity when the mixture ratio of hydrogen gas is 0% FIG. 8(a) and 0.6% FIG. 8(b), respectively.

When no hydrogen gas is supplied as shown in FIG. 8(a), the output at the center of laser beam almost zero as a result of the annular beam phenomenon. On the other hand, as shown in FIG. 8(b), it can be seen that when 0.6% hydrogen gas is supplied after copper metal lumps have melted, the output at the center of laser beam in the axial direction increased and the annular beam phenomenon was reduced.

Figure 9:
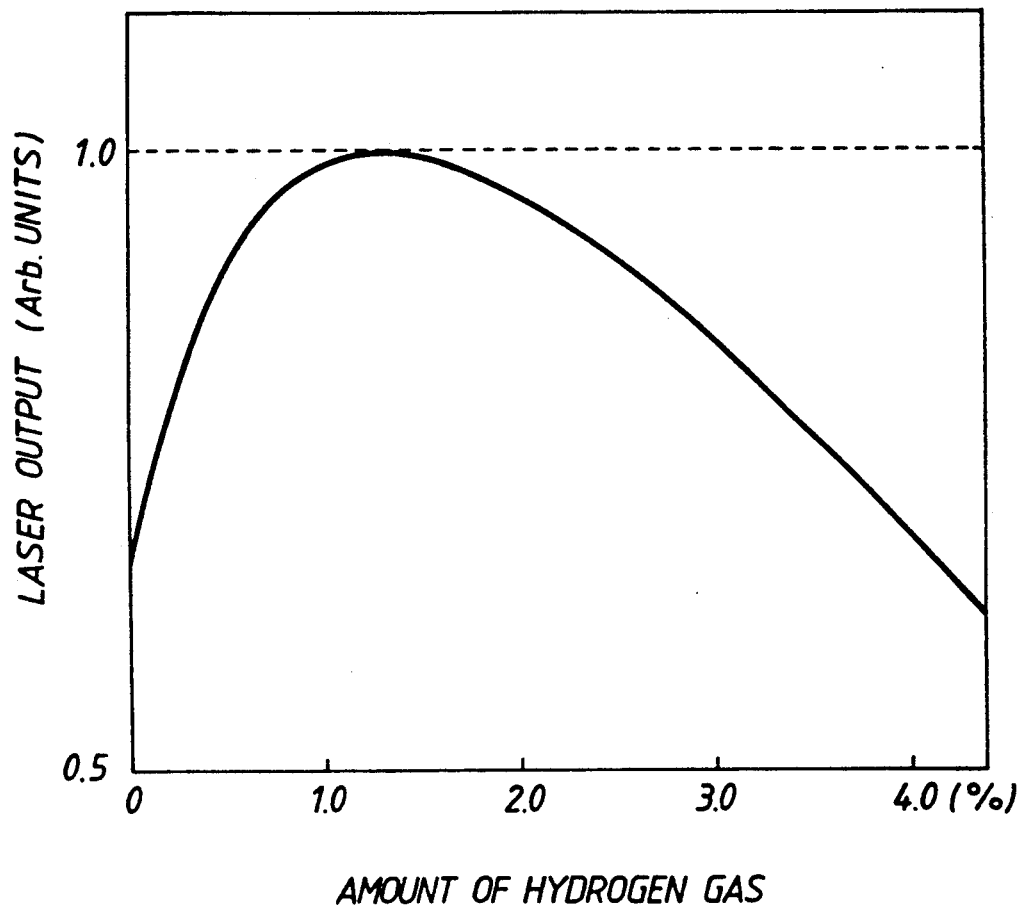
FIG. 9 is a graph showing the characteristics of the laser beam output to additive amounts of hydrogen gas.

FIG. 9 shows the relation of laser beam outputs to mixture ratio of hydrogen gas. As shown in FIG. 9, hydrogen gas in the mixture ratio of 0.1%-4.0% is very effective to keep the mixing ratio of buffer gas and metal vapor by which the intensity of the laser beam is kept at a high level. The hydrogen is especially effective when the electric discharge power density is high or the frequency is high. The mixing ratio of hydrogen gas between 1.0% to 1.5% is most effective to obtain the maximum value of the laser output.

In this invention, the molecular gas can be mixed at any time after the metal lumps begin to melt. If the molecular gas is mixed before the metal lumps melt, the electric discharge becomes unstable, and only a laser beam of weak power can be generated. This becomes more conspicuous for increased bore sizes.

Embodiment 2

Figure 10:
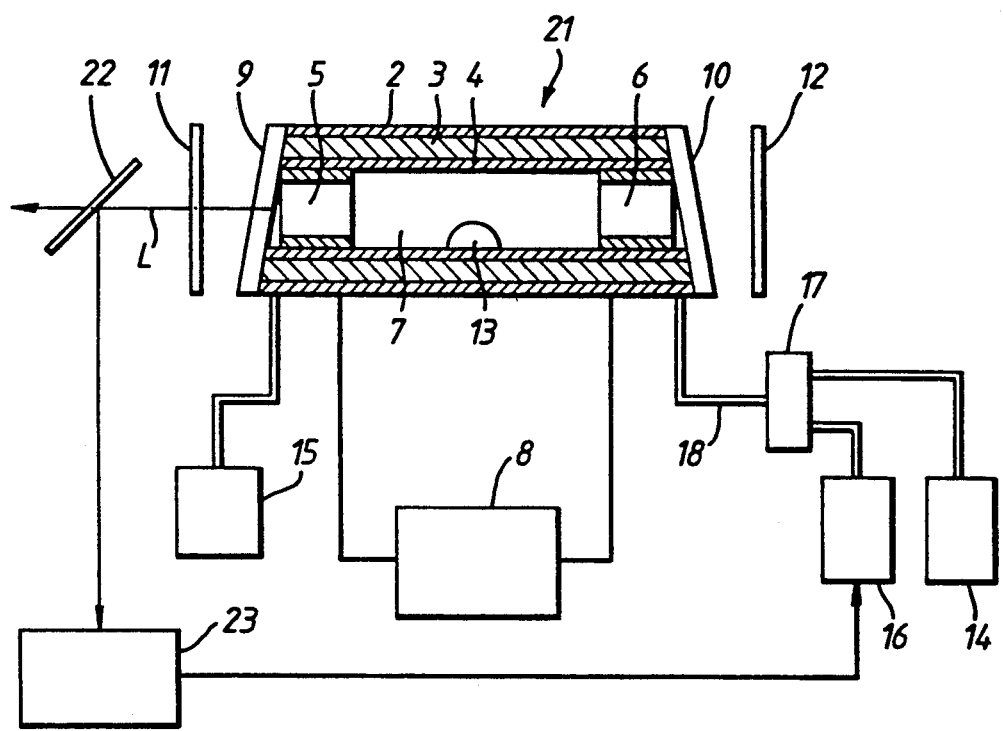
FIG. 10 is a schematic sectional view of a metal vapor laser apparatus of the second embodiment according to the present invention.

FIG. 10 shows metal vapor laser apparatus 21 representing a second embodiment of the invention. Elements in embodiment 2 which are the same as elements in embodiment 1 are designated by the sam reference numerals.

The major difference between Embodiment 2 and Embodiment 1 is that in Embodiment 2 the molecular gas is mixed after melting the metal lumps and after the laser beam is generated.

As shown in FIG. 10, the metal vapor laser apparatus 21 in this embodiment has a mirror 22 to reflect part of the laser beam L, which passes through a mirror 11, to a laser beam detector 23 which detects emission spectrum lines in the laser beam reflected by the mirror 22. The signal from the detector 23 controls the molecular gas supply device 16 to send the molecular gas to the gas mix device 17.

The gas mix device 17 sends the buffer gas and the molecular gas in suitable mixture ratio to the vacuum container 2 and the same effect as Embodiment 1 occurs.

One of the ways to detect the laser beam is to detect the emission spectrum as mentioned above. Other ways also can be used to detect the laser beam.

Figure 11:
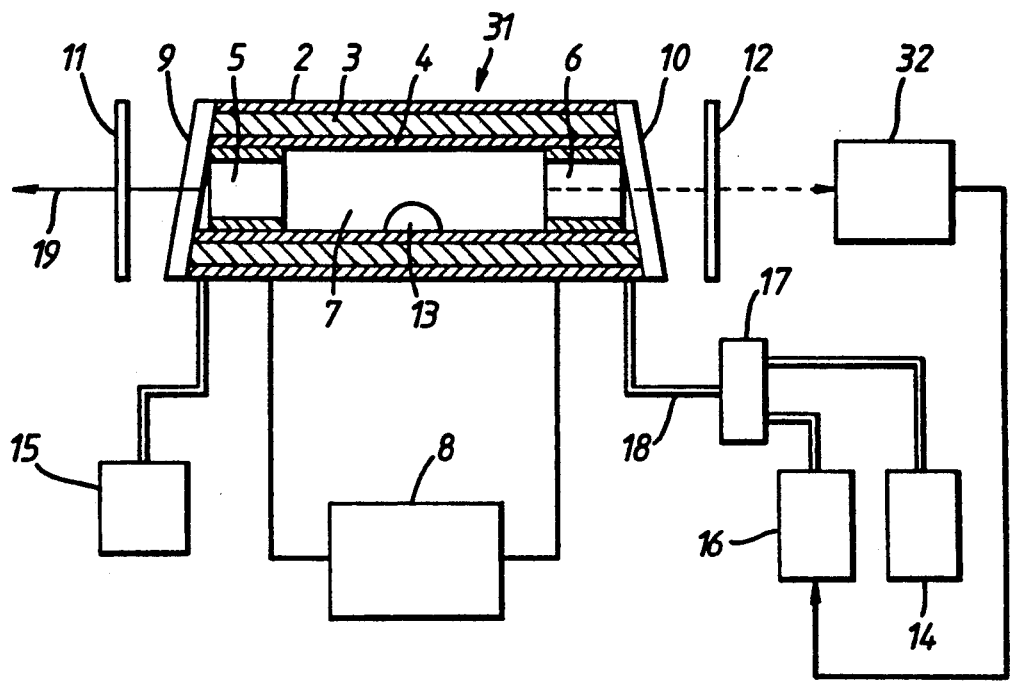
FIG. 11, 13-15, 20 and 24 are schematic sectional views of other metal vapor laser according to the present invention.

In metal vapor laser apparatus 31, as shown in FIG. 11, for example, the copper atom spectrum line generated when the copper lumps are melted can be detected by a spectrum detector 32 through the mirror 12. By the signal from the spectrum detector 32, the molecular gas supply device 16 is started to supply the molecular gas.

Figure 12:
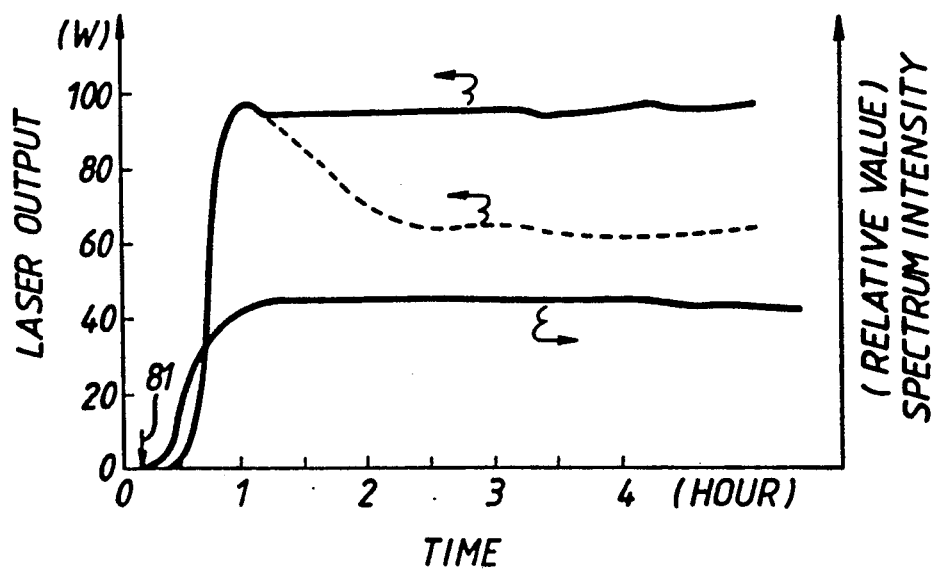

FIG. 12 shows the case of mixing the hydrogen gas when the copper spectrum lines are detected at the point indicated by the arrow 81. In this case, the laser beam output remains at the near maximum value shown by a continuous line. On the other hand, in the case of no hydrogen gas, the output is gradually reduced shown by a dotted line.

Figure 13:
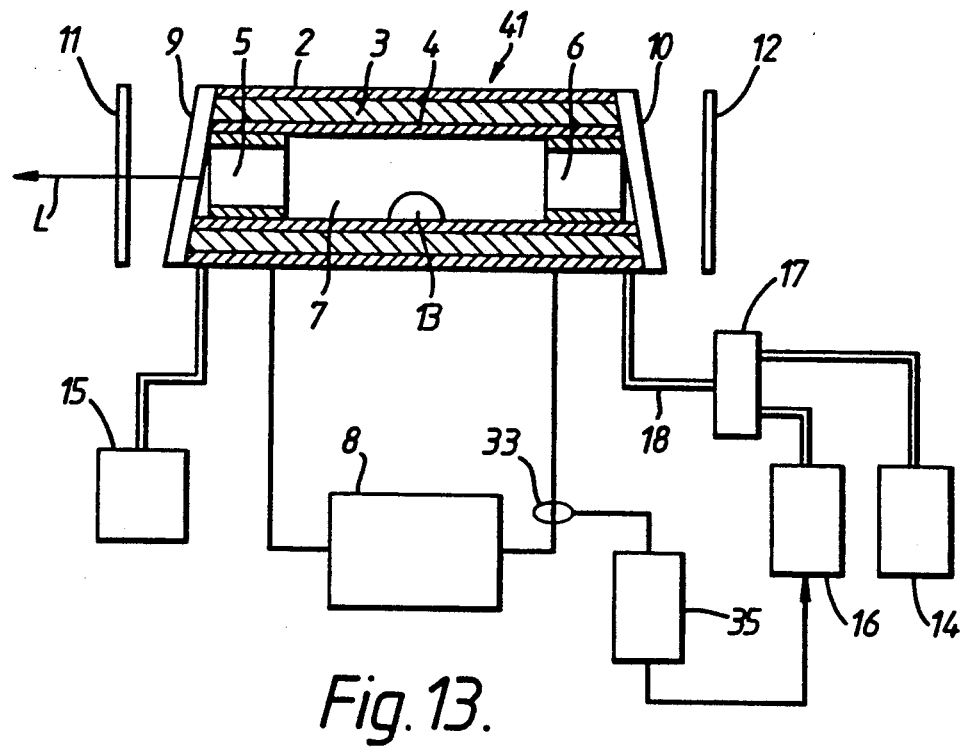

The metal vapor laser apparatus 41 as shown in FIG. 13 has an electric current detector 33 which detects the current from the power supply 8. A current comparator 35 compares the current value measured after the metal medium has melted or after a laser beam is generated with the current value measured before the metal medium melts. The comparator 35 determines whether the molecular gas is to be supplied or not, and controls the molecular gas supply device 16.

Figure 14:
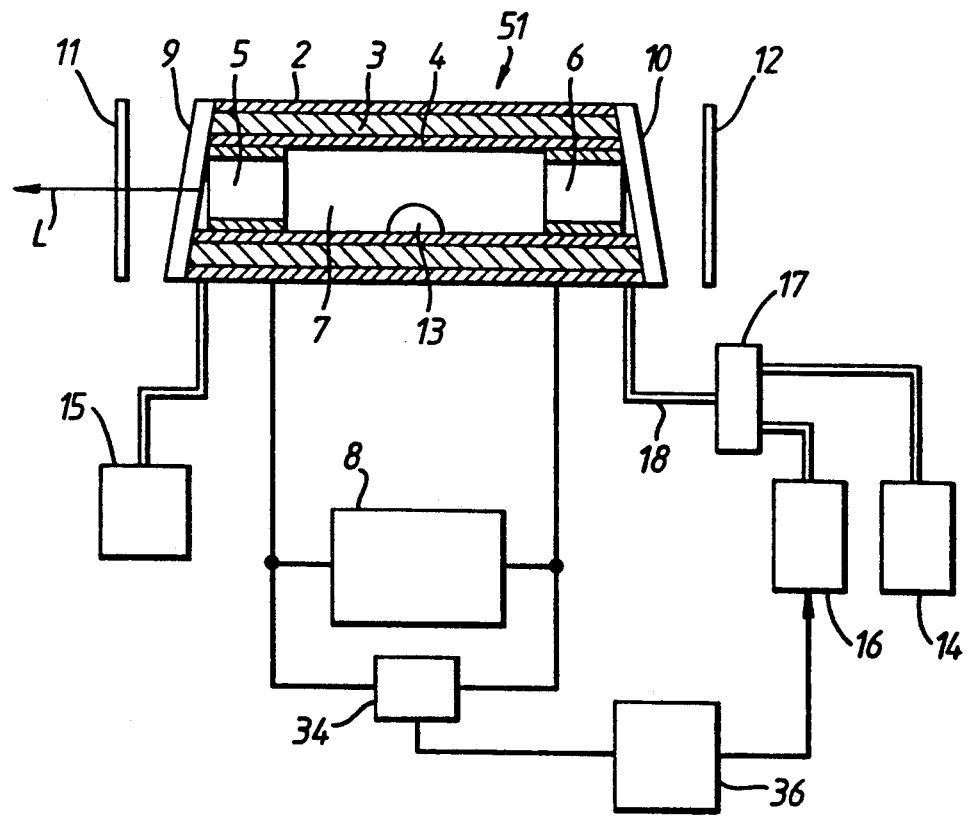

The metal vapor laser apparatus 51 as shown in FIG. 14 has a voltage detector 34 which detects the voltage of the power supply 8. A voltage comparator compares the voltage obtained by the detector 34 with the voltage before laser generating. Also, the comparator 36 determines whether the molecular gas is to be supplied or not, and controls the molecular gas supply device 16.

Figure 15:
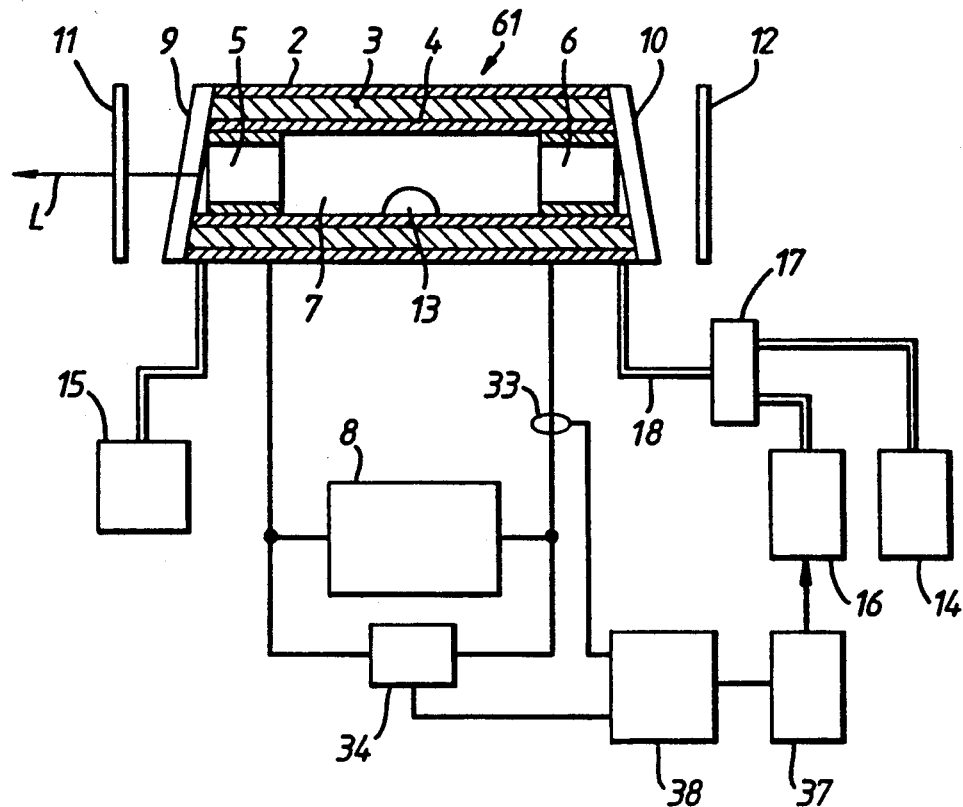

The metal vapor laser apparatus 61 shown in FIG. 15 has a resistance detector 38 which detects and calculates the resistance value using the signals from the electric current detector 33 and the voltage detector 34. A resistance comparator 37 compares the resistance obtained by the detector 38 with the resistance before laser generating. And the comparator 37 for determines whether to supply the molecular gas or not, and controls the molecular gas supply device 16.

Figure 16:
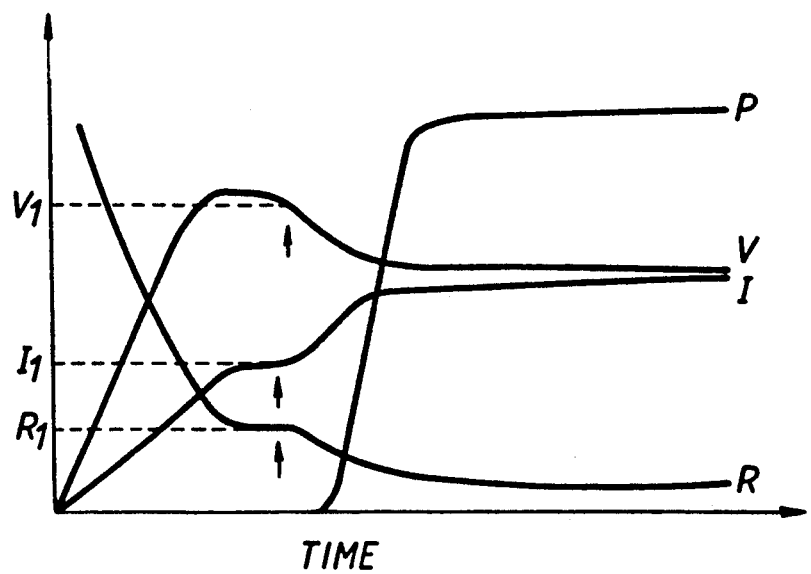
FIG. 16 is a graph showing changes of the current value, voltage value and resistance value.

In the cases of the apparatus shown in FIGS. 13 to 15, the values of the electric current I, voltage V, and resistance R vary are represented by the curves I, V and R, respectively, as shown in FIG. 16 for example. If the standard values of these parameters for supplying the molecular gas are defined as I1, V1, R1 alternatively, when these values are related as $I>I1$, $V<V1$, $R<R1$, (shown in FIG. 16 by arrows), then the molecular gas is supplied to mix.

Figure 17:
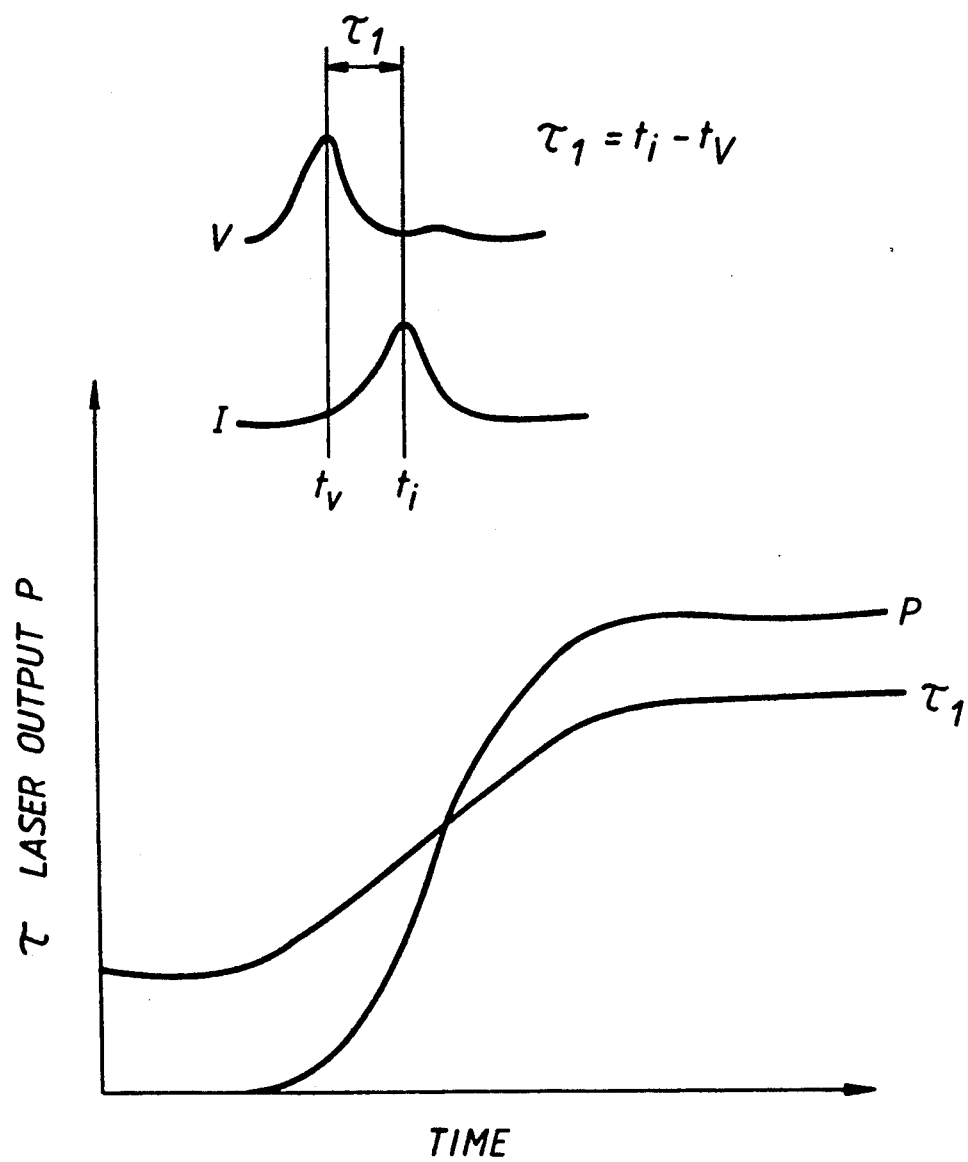
FIG. 17 is a graph to be used to detect the laser beam radiation.

As shown in FIG. 17, the interval $\tau 1$ between the discharge voltage peak at time tv and the discharge current peak at time ti is increased gradually with copper vapor generation. Therefore, when the value of $\tau 1$ reaches a certain level or more, the molecular gas is supplied and mixed with the buffer gas.

Figure 18:
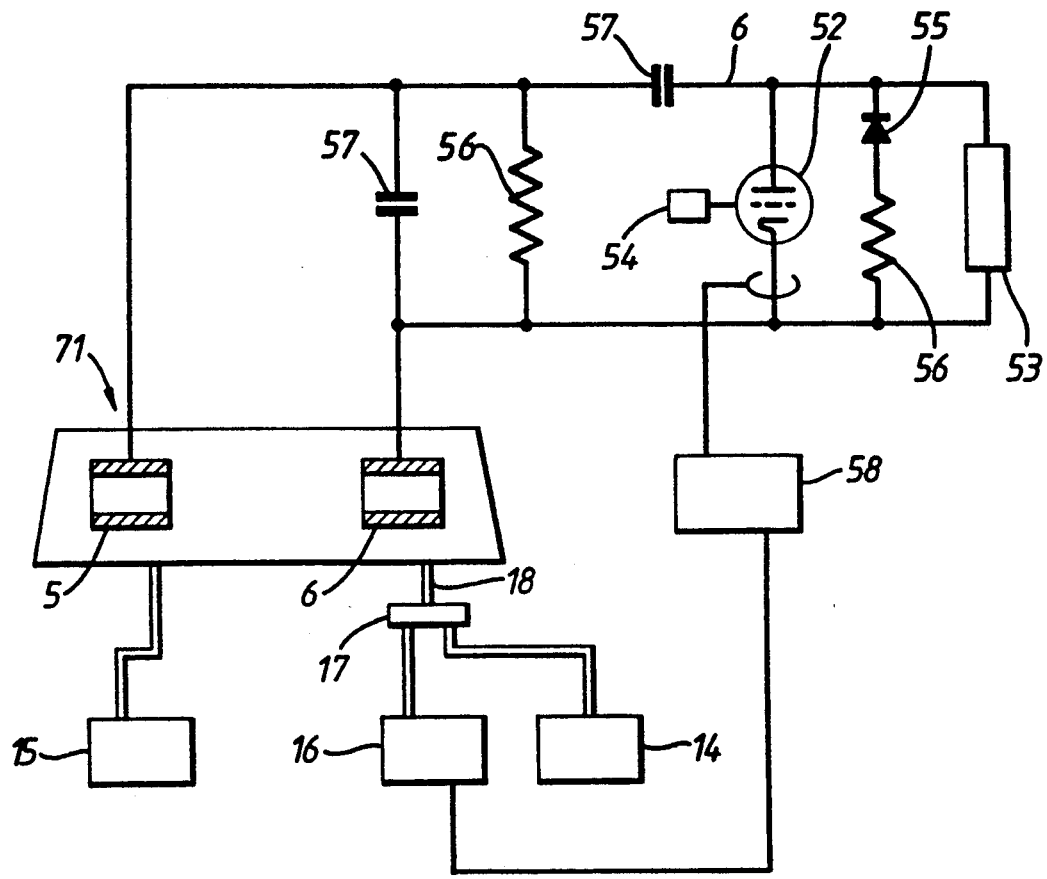
FIG. 18 is a schematic view showing a means to detect a radiation of laser apparatus.

The metal vapor laser apparatus 71 shown in FIG. 18 comprises a discharge circuit 61 including a charge electric source 53, a pulse generator 54, a diode 55, resistance 56 and condenser 57. Also, a switching device 52 is used for the power supply 8 to apply a discharge voltage between the electrodes 5 and 6 by switch opening and closing.

Figure 19:
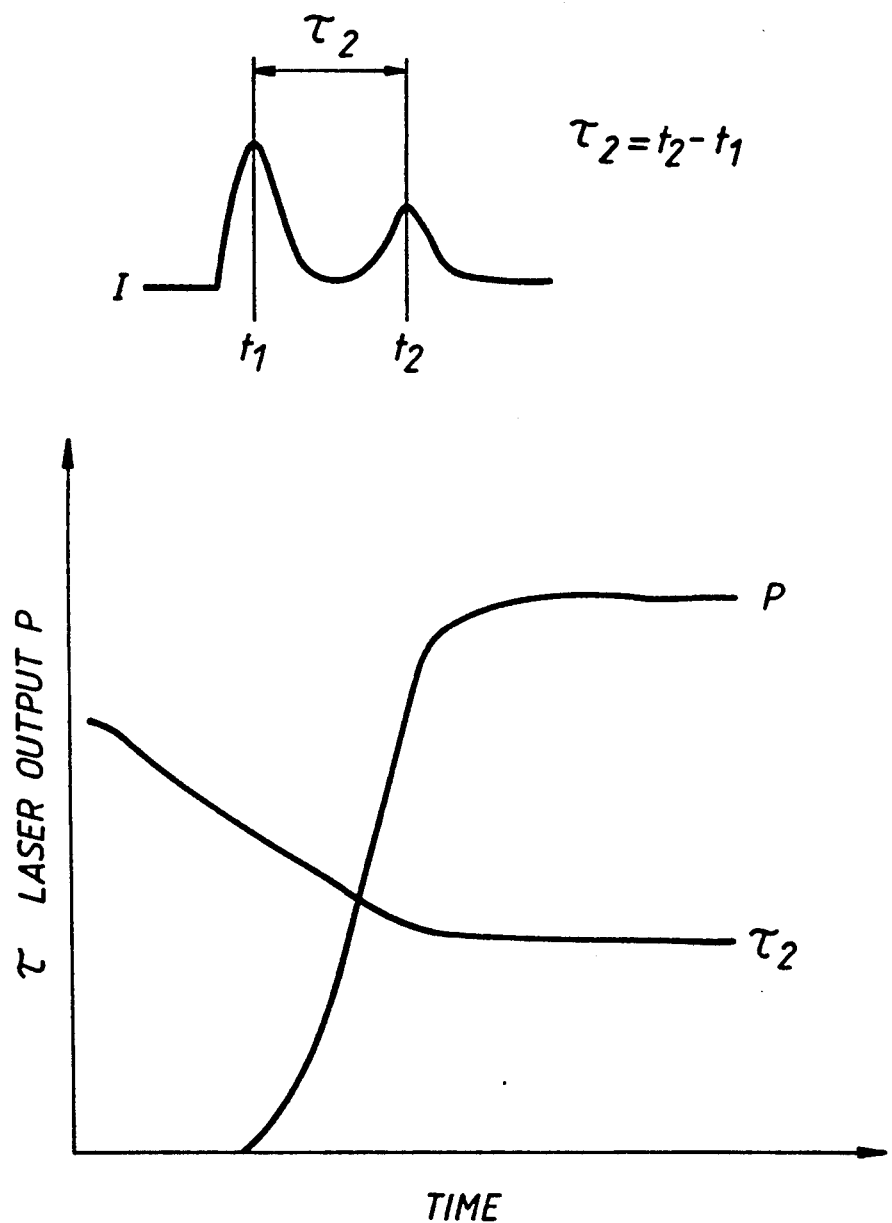
FIG. 19 is a graph to be used to detect the laser beam radiation.

In the apparatus 71, a detector 58 detects the time interval $\tau 2$ between the first pulse $\tau 1$ and the second pulse $\tau 2$ which flow through the switching device 52. When the value of $\tau 2$ is lower than or equal to a certain level, the molecular gas is supplied and mixed with the buffer gas as shown in FIG. 19.

When the relationship of the discharge voltage to time is known, the molecular gas supply may be determined either by the voltage or time or by using both of these parameters.

The determination of whether to mix the molecular gas can also be made by the detecting of plasma resistance or by observing the discharge current wave shape and discharge voltage wave shape.

Embodiment 3

Figure 20:
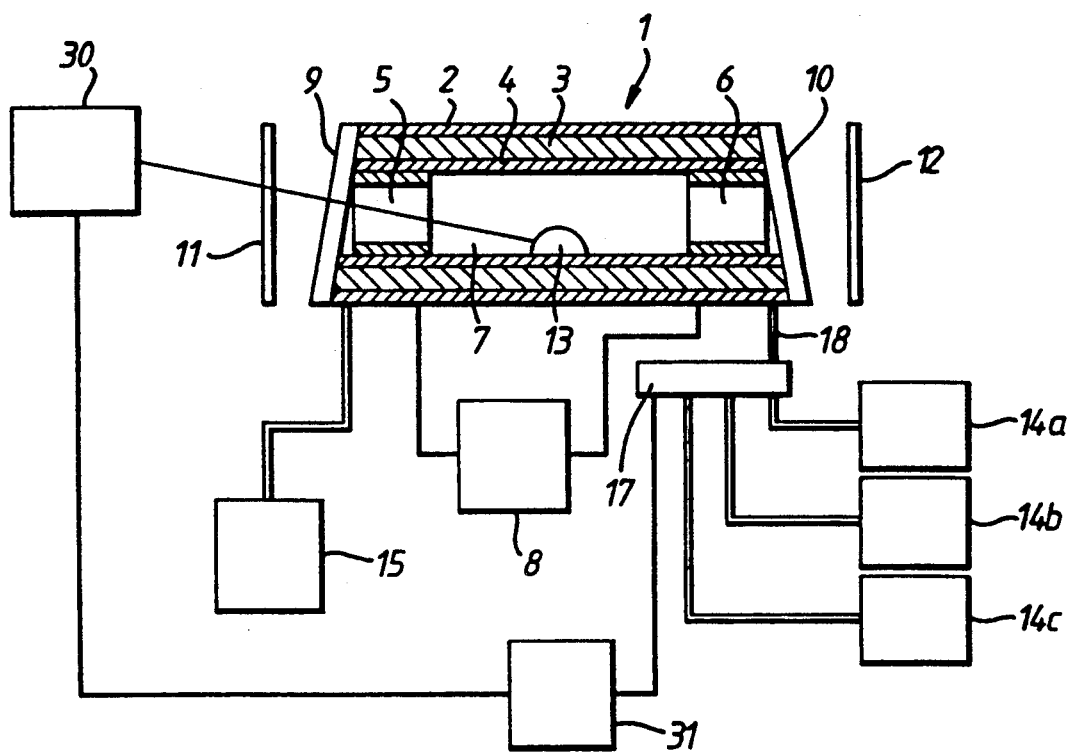

As shown in FIG. 20, gas supply devices 14a, 14b, and 14c are connected with the vacuum container 2, and the exhaust device 15 is also connected with the container 2. Helium, neon and hydrogen, as a molecular gas, are stored in the gas supply devices 14a, 14b and 14c, respectively. The gases are mixed by the gas mixing device 17 and supplied through the pass tube 18 to the vacuum container 2. The mixed gas is exhausted from the vacuum container 2 by the exhaust device 15 comprising a rotary pump (not shown).

Other components similar to those in embodiments which are discribed above, are designated by the same reference numbers.

Figure 21:
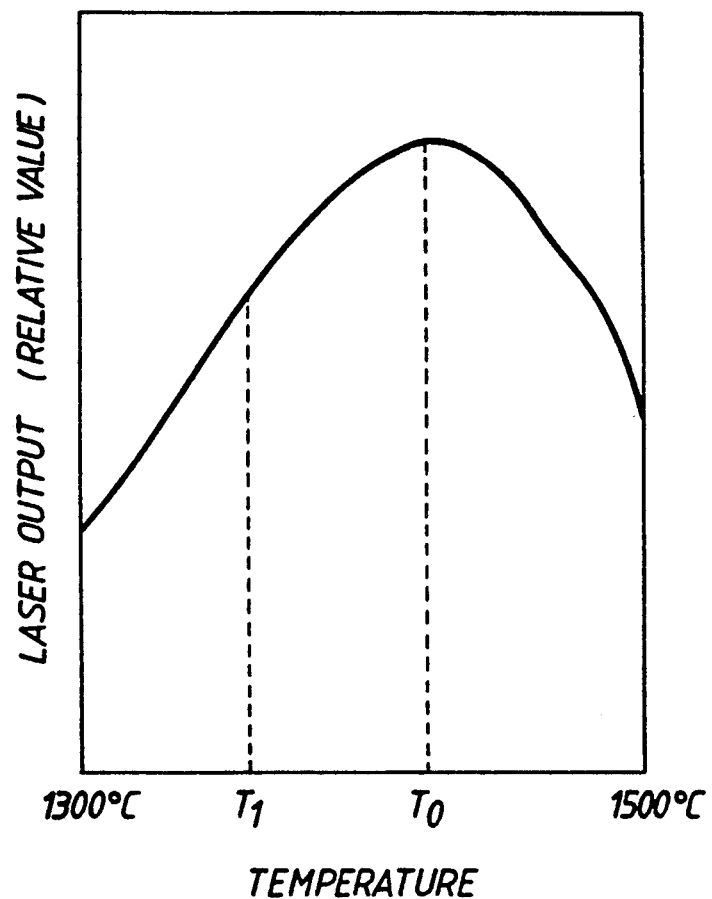
FIG. 21 and 22 are graphs showing the relation between the temperature and laser output; and, FIG. 23 is a graph showing the relation between the G/Y ratio and the laser output.

In this embodiment, the surface temperature of the metal lumps 13 is measured by the temperature detecting device 30. When laser beam is generated, the measuring results are sent to a control unit 31. In the control unit 31, for example, data for the relation between the surface temperature and laser output, such as shown in FIG. 21, is stored. When the actual surface temperature T1 of the metal lumps 13 is different from the ideal temperature data To, stored in the control unit 31, the control signal is sent from the unit 31 to the gas mixing device 17. Then the mixture ratio of the gases is adjusted and the surface temperature of the lumps 13 is also adjusted by controlling gas supply devices 14a, 14b and 14c.

The discharge resistance can be changed by controlling the mixture ratio of buffer gases. The metal vapor density in the plasma can be adjusted by changing the discharge resistance.

It is especially effective that the molecular gas, such as a hydrogen gas, is mixed in small amounts to the rare gas, such as neon or helium, used as buffer gas. Because the molecular gas has a much lower excitation level compared with the excitation level of rare gas or metal atoms, when a small amount of the molecular gas is mixed with the buffer gas, the electron temperature of the plasma is lowered and the discharge resistance is increased to a higher level than the case of the buffer gas of a rare gas. However, when too much of the molecular gas is mixed, then electrons have insufficient energy to excite the metal vapor. It is preferable that the mixture ratio of the molecular gas to the buffer gas is 0.1%–4.0%, more preferably 1.0% - 1.5%.

The measurement for the surface temperature of the metal lumps may be done at least one time after the laser beam has been generated for a duration of time. It may be useful to store in a memory, the data of the mixture ratio or the time at which to start supplying the molecular gas etc. and use the stored data to generate the laser beam again.

If the relationship between the surface temperature of the metal lumps and the inside temperature of the plasma tube 4 is already known, instead of the surface temperature of the metal lumps, the inside temperature of the plasma tube can be used as control data.

When the metal lumps are arranged in a case or the like, the case temperature of the case also can be used as control data instead of the surface temperature of the metal lumps.

Embodiment 4

The use of different metals, such as gold or copper lumps, for example, generates two or more colors of laser beams. For example, the copper metal vapor laser apparatus generates the laser beam of a green (511 nm wavelength) beam G and a yellow (578 nm wavelength) beam Y.

Figure 22:
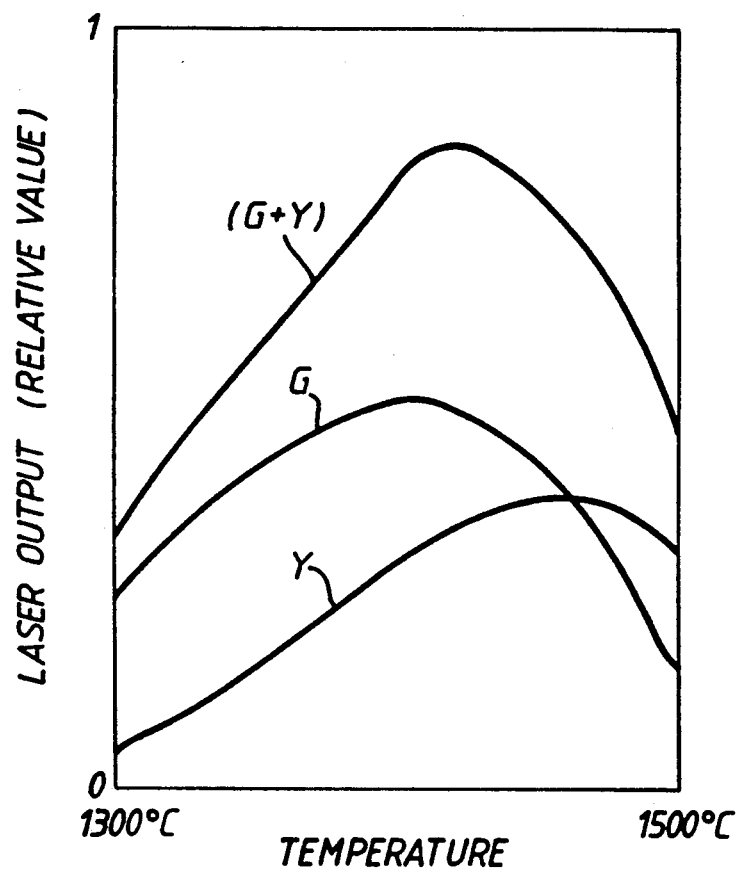

FIG. 22 shows the correlation between the temperature of the copper metal lumps, the output level of each element G and Y and total output level of G+Y in the beam. Each element of the beam is changed depending on the temperature of the metal lumps.

Figure 23:
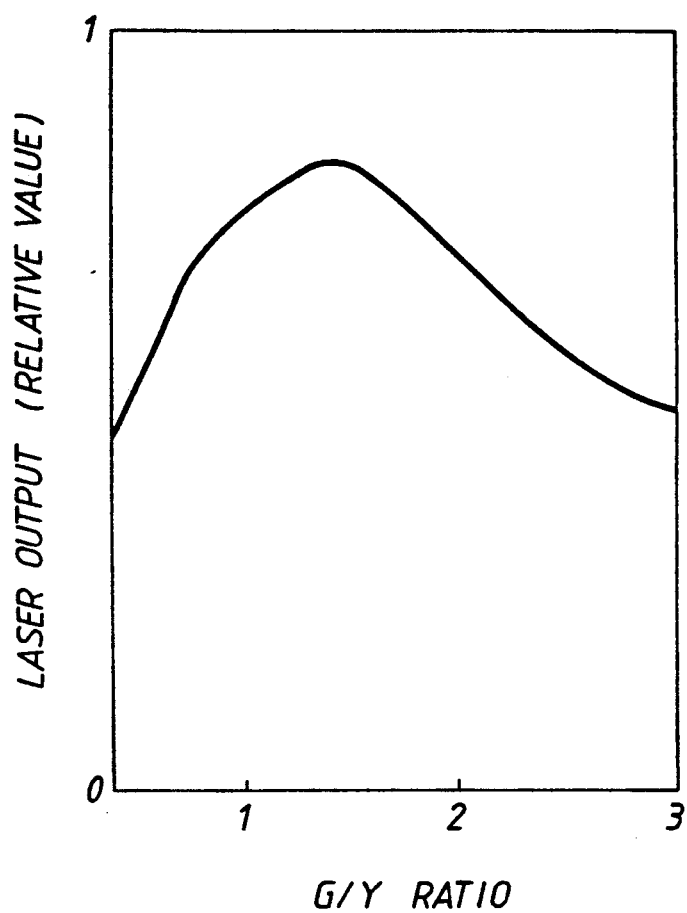

FIG. 23 shows the correlation between the G/Y ratio (the ratio of green laser beam output to yellow laser beam output) and the total laser output. In the range of 1300° C. to 1500° C., the G/Y ratio has a linear relation to the temperature of the metal lumps. Therefore, by the measurement for G/Y ratio, the temperature of the metal lumps can be known indirectly.

Figure 24:
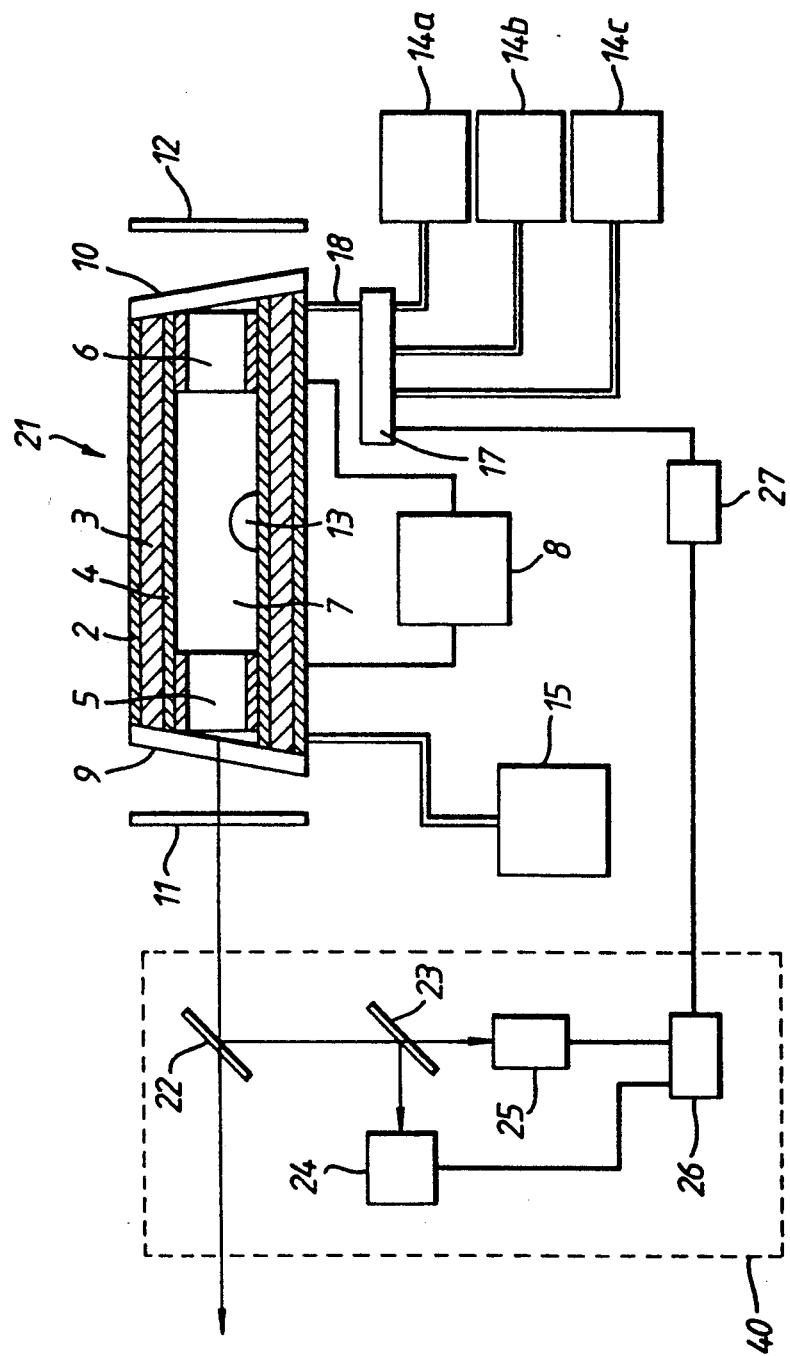

FIG. 24 shows a metal vapor laser apparatus which can adjust the temperature of the metal lumps by information obtained by measuring the output ratio of each wavelength. That metal vapor laser apparatus 21 comprises a laser element measuring device 40. The measuring device 40 has a mirror 22 reflecting a part of the laser beam passing the mirror 11, a dichroic mirror 23 reflecting a yellow element of the beam and passing through a green element of the beam, both of the beams being reflected from the mirror 22, detecting devices 24, 25 to detect the respective yellow and green elements, and a processing unit 26 to process the data detected by the devices 24, 25, to get the G/Y ratio. The data of G/Y ratio obtained from the processing unit 26 is evaluated by a controller 27 to control the gas mixing device 17. The gas mixing device 17 controls the values of gas supply devices 14a, 14b and 14c to adjust the mixture ratio of the gases.

This embodiment uses a correlation between the output ratio of the wavelength elements, such as the G/Y ratio, and the temperature to control the mixture ratio of the gases. By controlling the mixture ratio, the discharge resistance is changed and the metal vapor density in the plasma adjusted as similar as the embodiment 3.

A ratio of an output in a certain wavelength to the total output (the sum of each output in each wavelength) may be used to control the gas mixture ratio. When the laser has three wavelength elements, two elements are chosen from the three elements and the ratio of the two elements is used to adjust the mixture ratio of the buffer gas from the gas supply device 14a and 14b.

As shown in FIG. 22, the peak output temperature for the green element is lower than the peak output temperature of the yellow element. Therefore, when only one element of the beam is needed, the temperature of the metal lumps is adjusted to get the maximum strength of that element by detecting the surface temperature of the metal lumps, like described for Embodiment 3, or detecting the G/Y ratio like described with respect to Embodiment 4.

Rare gas such as neon, helium, etc. can be used as the buffer gas. Hydrogen gas, oxygen gas, nitrogen gas, carbon monoxide, carbon dioxide, methane-ethane or other molecular gases including a hydrogen atom can be used as the molecular gas in this invention, either individually or in combination.

Copper, gold and strontium are examples of metals for the metal lumps.

It is preferable that the diameter of the discharge chamber is in a range of from about 60 mm to 120 mm (from about 25 $cm^2$ to 120 $cm^2$). The sectional shape of the discharge unit can be not only circular but also polygonal.

The present invention has been described with respect to specific embodiments. However, other embodiments based on the principles of the present invention should be obvious to those of ordinary skill in the art. Such embodiments are intended to be covered by the claims.

What is claimed is:

1. A metal vapor laser apparatus for generating a laser beam comprising:
   a vacuum container;
   a pair of spaced electrodes in the vacuum container;
   a metal medium in the vacuum container;
   means for supplying a buffer gas to the vacuum container;
   a power supply for applying a discharge voltage across the electrodes to excite the buffer gas so that the metal melts and vaporizes; and
   means, separate from the buffer gas supplying means, for supplying at least one other gas to the vacuum container after melting of the metal medium occurs to enhance lasing efficiency.

2. The laser apparatus of claim 1, wherein the means for supplying at least one other gas supplies a molecular gas.

3. The laser apparatus of claim 2, including means for maintaining the amount of the molecular gas in the range of 0.1 to 4.0% of gas fill within the container.

4. The laser apparatus of claim 2, including means for maintaining the amount of the molecular gas in the range of 1.0 to 1.5% of gas fill within the container.

5. The laser apparatus of claim 1, wherein the means for supplying at least one other gas supplies hydrogen gas.

6. The laser apparatus of claim 1, further comprising a detecting device for detecting metal vapor pressure in the vacuum container.

7. The laser apparatus of claim 6, wherein the detecting device detects a metal vapor pressure for a metal vapor content of 0.01% or more of the buffer gas in the container to operate the means for supplying at least one other gas.

8. The laser apparatus of claim 1, further comprising a detecting device for detecting melting of the metal medium.

9. The laser apparatus of claim 8, further comprising a detecting device for detecting temperature of the metal medium surface.

10. The laser apparatus of claim 9, wherein the detecting device detects the temperature of the metal medium at a time when the metal vapor pressure for a metal vapor content of at least 0.01% of the gas in the container to operate the means for supplying at least one other gas.

11. The laser apparatus of claim 1, further comprising a detecting device for detecting an atomic spectrum line.

12. The laser apparatus of claim 11, wherein the detecting device detects emission of an atomic spectrum line to operate the means for supplying at least one other gas.

13. The laser apparatus of claim 1, further comprising a detecting device for detecting a discharge current, and for operating the means for supplying at least one other gas when the discharge current is over a certain value.

14. The laser apparatus of claim 1, further comprising a device for detecting a discharge voltage, and for operating the means for supplying at least one other gas when the discharge voltage is not greater than a certain value.

15. The laser apparatus of claim 1, further comprising a detecting means for detecting a time of discharge current peak and a time of discharge voltage peak and means for detecting an interval between the time of the discharge current peak and the time of discharge voltage peak to operate the means for supplying at least one other gas when the interval is over a certain value.

16. The laser apparatus of claim 1, further comprising a detecting means for detecting discharge resistance from values of discharge current and discharge voltage, and operating the means for supplying at least one other gas when the discharge resistance is under a certain value.

17. The laser apparatus of claim 1, wherein the cross-sectional area of the laser beam is 25 cm² or more.

18. The laser apparatus of claim 1, wherein the means for supplying at least one other gas includes means for supplying at least two kinds of rare gas as buffer gas into the container.

19. The laser apparatus of claim 1, wherein at least one kind of rare gas, and at least one kind of molecular gas are supplied into the container.

20. The laser apparatus of claim 1, wherein the means for supplying at least one other gas is operated when generating the laser beam.

21. A metal vapor laser apparatus for generating a laser beam comprising:
a vacuum container;
a pair of electrodes in the vacuum container;
means for supplying a buffer gas to the vacuum container;
a metal medium in the vacuum container, said metal medium being vaporizable in the buffer gas by discharge between the electrodes;
a switching device connected to the electrodes;
a power supply for applying a discharge voltage between electrodes by opening and shutting the switching device to develop current pulses in the switching device;
means for detecting a time interval between pulses of the current flowing in the switching device; and
means, separate from the buffer gas supplying means, for supplying at least one other gas to the vacuum container to enhance lasing efficiency when the time interval reaches a predetermined value.

22. A metal vapor laser apparatus for generating a laser beam comprising:
a vacuum container;
means for supplying at least two kinds off gases to the vacuum container;
a pair of electrodes in the vacuum container;
a power supply for applying a discharge voltage across the electrodes in the presence of at least one of the two kinds of gases;
a metal medium in the vacuum chamber and vaporizable by discharge between the electrodes; and
control means for detecting an operating condition of the laser apparatus and for controlling a mixture ratio of the gases in accordance with the detected operating condition.

23. The laser apparatus of claim 22, wherein the gases include at least one kind of molecular gas.

24. The laser apparatus of claim 22, wherein the control means detects temperature of the metal medium.

25. The laser apparatus of claim 22, wherein the control means detects a ratio of the wavelength element of the laser beam.

26. A method of operating a metal vapor laser apparatus for generating a laser beam having a vacuum container and a pair of spaced electrodes in the vacuum container, said method comprising the steps of:
supplying a buffer gas to the vacuum container under negative pressure;
applying a discharge voltage across the electrodes to excite the buffer gas;
melting and vaporizing a metal medium in the vacuum container by heat from the excited buffer gas; and
supplying at least one other gas to the vacuum container after melting of the metal medium occurs to enhance lasing efficiency the laser apparatus.

27. The method of claim 26, wherein the other gas is a molecular gas.

28. The method of claim 27, wherein the molecular gas is hydrogen gas.

29. The method of claim 27, further comprising the steps of detecting the metal vapor pressure in the vacuum container; and controlling the supply of molecular gas to the vacuum container when the metal vapor pressure reaches a value of 0.01% or more.

30. The method of claim 29, further comprising the step of detecting the metal surface temperature when the metal vapor pressure reaches the value of 0.01% for the gas.

31. The method of claim 27, further comprising the step of detecting an atomic spectrum line to control the supply of molecular gas to the container.

32. The method of claim 27, further comprising the step of detecting the electric current of the applied discharge voltage to control the supply of molecular gas to the container.

33. The method of claim 27, further comprising the step of detecting the discharge voltage to control the supply of molecular gas to the container.

34. The method of claim 27, further comprising the step of detecting the time of discharge current peak and the time of discharge voltage peak and supplying molecular gas to the container after the difference between the time of the discharge current peak and the time of discharge voltage peak is above a certain value.

35. The method of claim 27, further comprising the step of detecting the discharge resistance from the values of discharge current and discharge voltage and supplying molecular gas to the container after the discharge resistance is under a certain value.

36. The method of claim 27, wherein the amount of molecular gas is in the range of 0.1 to 4.0% of gas in the container.

37. The method of claim 26, wherein at least two kinds of rare gas are supplied as buffer gas into the container.

38. The method of claim 26 wherein the step of supplying at least one other gas includes selecting at least one of hydrogen gas, oxygen gas, nitrogen gas, carbon monoxide, carbon dioxide, methane-ethane and other gases containing the hydrogen atom.

* * * * *